United States Patent [19]

Tobin, Jr.

[11] 4,323,992
[45] Apr. 6, 1982

[54] DEPTH SOUNDER REPEATER STRUCTURE AND METHOD

[76] Inventor: Leo W. Tobin, Jr., Edwards Point Rd., Rumson, N.J. 07760

[21] Appl. No.: 90,177

[22] Filed: Nov. 1, 1979

Related U.S. Application Data

[63] Continuation of Ser. No. 874,689, Feb. 2, 1978, abandoned, which is a continuation of Ser. No. 810,693, Jun. 28, 1977, abandoned, which is a continuation of Ser. No. 646,394, Jan. 2, 1976, abandoned.

[51] Int. Cl.³ .............................................. G015 15/14
[52] U.S. Cl. .................................... 367/108; 367/112; 367/114
[58] Field of Search ......................... 367/108, 112, 114

[56] References Cited

U.S. PATENT DOCUMENTS

| 3,223,965 | 12/1965 | Beebe | 367/112 |
|---|---|---|---|
| 3,307,143 | 2/1967 | Wyse et al. | 367/108 |
| 3,437,986 | 4/1969 | Noble | 367/108 |
| 3,528,053 | 9/1970 | Rubin | 367/112 |
| 3,588,795 | 6/1971 | Linardos et al. | 367/108 |
| 3,696,326 | 10/1972 | McAlpin | 367/108 |
| 3,733,582 | 5/1973 | Eck et al. | 367/108 X |
| 3,757,285 | 9/1973 | Ferre | 367/108 |
| 3,783,442 | 1/1974 | Feinman et al. | 367/114 |
| 3,787,802 | 1/1974 | Brahman | 367/108 X |
| 3,787,803 | 1/1974 | Beebe | 367/114 X |
| 3,789,352 | 1/1974 | Forsyth | 367/13 |

FOREIGN PATENT DOCUMENTS

2504200  8/1976  Fed. Rep. of Germany ...... 367/108

*Primary Examiner*—Richard A. Farley
*Attorney, Agent, or Firm*—Whittemore, Hulbert & Belknap

[57] ABSTRACT

A depth sounder repeater providing a remote display of the depth of a body of water digitally or by meter movement, a depth alarm, a lost echo signal, and a meter scale expansion for shallow depth display in conjunction with a ship's sonar, display of "alarm depth" while setting. The depth display may be digital or analog and multiple displays are possible as required. The depth sounder repeater includes a signal processor for providing signals initiated with the main ultrasonic pulse transmission from the ship's sonar and terminated with the receipt of the first echo of the corresponding main transmitted pulses. The signal processor signals may then be used to initiate and terminate production of a train of clock pulse signals which are counted to provide a digital depth display, or alternatively the signal processor signal may be integrated in analog meter display apparatus.

18 Claims, 8 Drawing Figures

DEPTH SOUNDER REPEATER STRUCTURE AND METHOD

CROSS REFERENCE TO RELATED APPLICATIONS

This application is a continuation of application Ser. No. 874,689 filed Feb. 2, 1978, which is a continuation of application Ser. No. 810,693 filed June 28, 1977, which is a continuation of application Ser. No. 646,394 filed Jan. 2, 1976 all now abandoned.

BACKGROUND OF THE INVENTION

1. Field of the Invention

The invention relates to depth sounders and refers more specifically to a signal processor unit for use in conjunction with a ship's sonar which facilitates multiple remote depth displays in either digital or analog form and which includes depth alarm, lost echo, alarm set display, and scale expanding capabilities.

2. Description of the Prior Art

In the past, sonar-type depth sounders have been known which have produced ultrasonic pulses from a transducer mounted on the bottom of a boat and received corresponding ultrasonic pulses reflected from the bottom of a body of water. The circuitry of the prior depth sounders has been such that the time between a transmitted pulse and an echo or reflection of the same pulse has been used to determine the depth of the body of water, since the time of travel of the ultrasonic signals in water is known.

Displays for such prior depth sounders have in the past included motor driven flashers wherein an electric motor has been driven at a constant speed to rotate an arm mounted on the motor shaft and wherein a light-emitting diode or a neon lamp at the tip of the arm has been caused to flash on transmission of the main pulse and again on receipt of the echo signal. Such display devices have also been used to provide a permanent record with the motor driven arm traveling over a moving strip of paper, which paper is electrically discolored by an electrical pulse occurring concurrently with the transmitted pulse and each echo as received. Meter displays have also been used in prior depth sounders which produce an average current through a microammeter in response to integration of pulses received from the sonar, which pulses are started and stopped with the sonar main pulse and echo.

SUMMARY OF THE INVENTION

In accordance with the present invention, there is provided a depth sounder structure and method for utilization with a ship's sonar which will provide a remote depth indication of any or all of the above type, and which in particular is capable of providing a digital depth display as well as a display of the ntegrating meter type, either of which may be permanent displays. Further, the invention includes the steps of and structure for indicating a depth less than a predetermined minimum depth, indicating loss of echo from the ship's sonar, and providing an expanded scale display.

In particular, the depth sounder structure and method of the invention includes signal processor structure for providing signals in accordance with the method of the invention initiated with the transmitted ultrasonic pulses of the ship's sonar and terminated with the receipt of the first corresponding echo received by the ship's sonar. The pulse output from the signal processor may then be used directly in an integrating meter to provide an analog depth display at locations remote from the ship's sonar. The signals from the signal processor may also and preferably be used to provide a series of clock pulses of a specified pulse repetition rate, the number of which are determined by the length of the signal processor signals, which digital pulses may then be counted and thus utilized to provide a remote digital display of water depth.

The structure for and method of providing an alarm when a depth below a minimum depth is detected includes structure for and the method of comparing a reference signal, with the signals utilized to provide the depth display from the signal processor and providing an alarm when the relation between the reference signal and the signal processor signals indicates a depth less than the predetermined alarm depth.

The structure for and method of indicating a lost echo from the ship's sonar includes structure operable only on receipt of the echo signal which functions to prevent depth display when the echo signal is not present.

Similarly, the structure for and method of expanding the scale of the display, on the depth being displayed being below a predetermined minimum depth, comprises structure for changing the display parameters in response to the depth being below a predetermined minimum.

DESCRIPTION OF THE PREFERRED EMBODIMENTS

Figure 1:
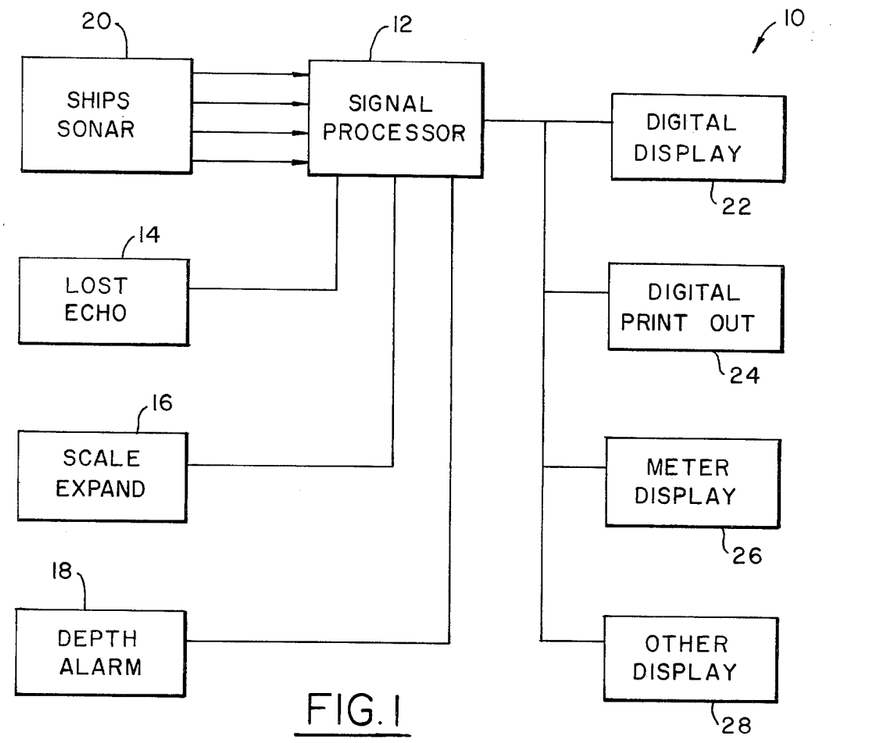
FIG. 1 is a block diagram of the depth sounder structure for practicing the depth sounding method of the invention in conjunction with a ship's sonar, illustrating a plurality of display possibilities.

The depth sounder structure 10 illustrated in FIG. 1 includes a signal processor 12 which may include lost echo structure 14, scale expanding structure 16, and depth alarm structure 18. The signal processor 12 is intended to be used with a ship's sonar 20 to provide any or all of a plurality of display possibilities such as the digital display 22, the digital print-out 24, a meter display 26, or other displays indicated generally 28 in FIG. 1.

In accordance with the method of the invention, the alarms or indications by the lost echo structure 14, scale expanding structure 16, and depth alarm structure 18, as well as the displays provided by the digital display 22, digital print-out 24, meter display 26, or other displays 28, may be provided either within or in a position remote from the ship's sonar 20.

Figure 2:
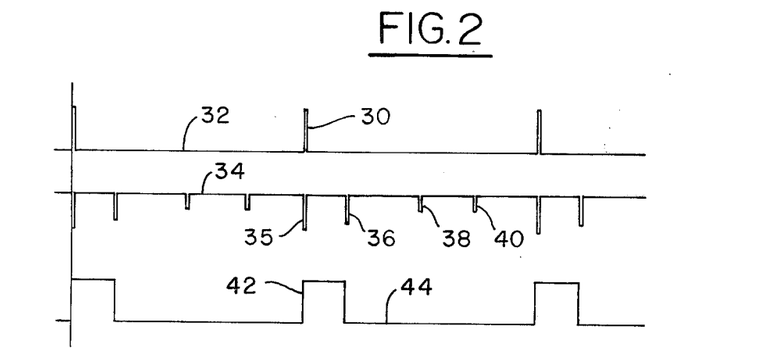
FIG. 2 illustrates wave shapes useful in explaining the operation of the signal processor of FIG. 1.

As shown best in FIG. 2, the signal processor 12 utilizes the transmitted main sonar ultrasonic pulse signal 30 or its trigger signal and first echo 36 received from the reflection of the main sonar ultrasonic signal to provide a square wave output signal. The transmitted main sonar ultrasonic signal 30 or its trigger signal from a sonar transmitter are indicated on line 32 of the chart of FIG. 2. The signals received by the sonar receiver as indicated on line 34 of the chart of FIG. 2 include spillover of the transmitted main sonar signal 35 along with first echo 36, and subsequent echoes 38 and 40 thereof.

It is to be understood that any given sonar may supply positive or negative transmitted pulse related signals or positive or negative echo signals, depending upon the design characteristics of the ship's sonar. Depending on the polarity of the pulses available from the ship's sonar, the signal processor may or may not be required to be preceded by an inverting amplifier to place said signals in the polarity format shown in FIG. 2.

The output square wave pulse 42 of the signal processor 12 is indicated on line 44 in FIG. 2 and as shown is initiated at the same time as the initiation of the transmitted main sonar pulse 30 and is terminated with the receipt of the first echo signal 36 by the sonar 20.

In accordance with the invention, the pulses 42 may preferably be used to initiate and terminate the production of appropriate clock signals which may be counted to provide a digital display of the depth of the water over which the ship's sonar passes. Alternatively, the pulses 42 may be utilized to provide a remote analog display of the depth of a body of water over which the ship's sonar passes.

Figure 3:
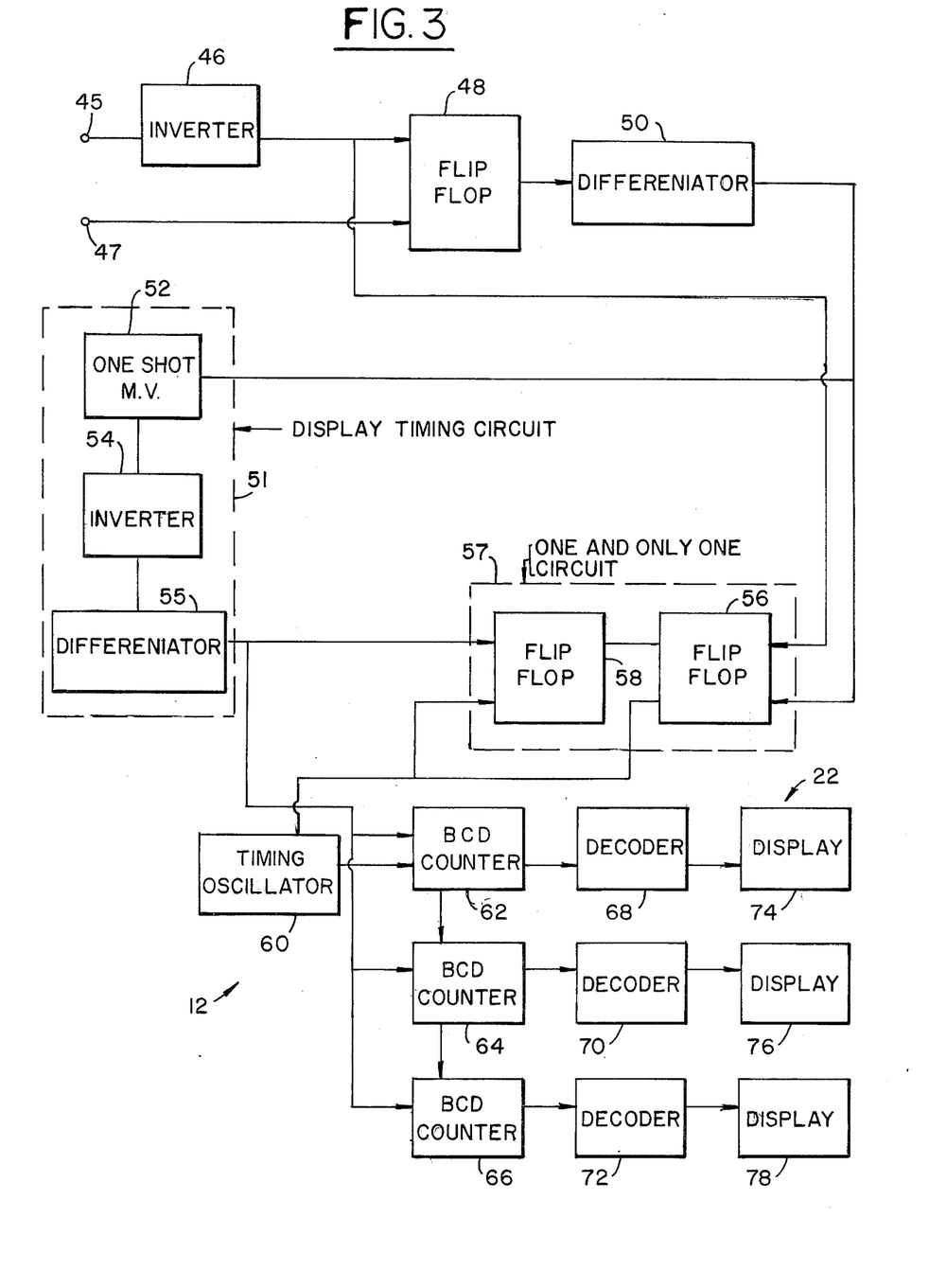
FIG. 3 is a block diagram of a preferred embodiment of depth sounder structure, constructed in accordance with the invention for performing the method of the invention.
Figure 4:
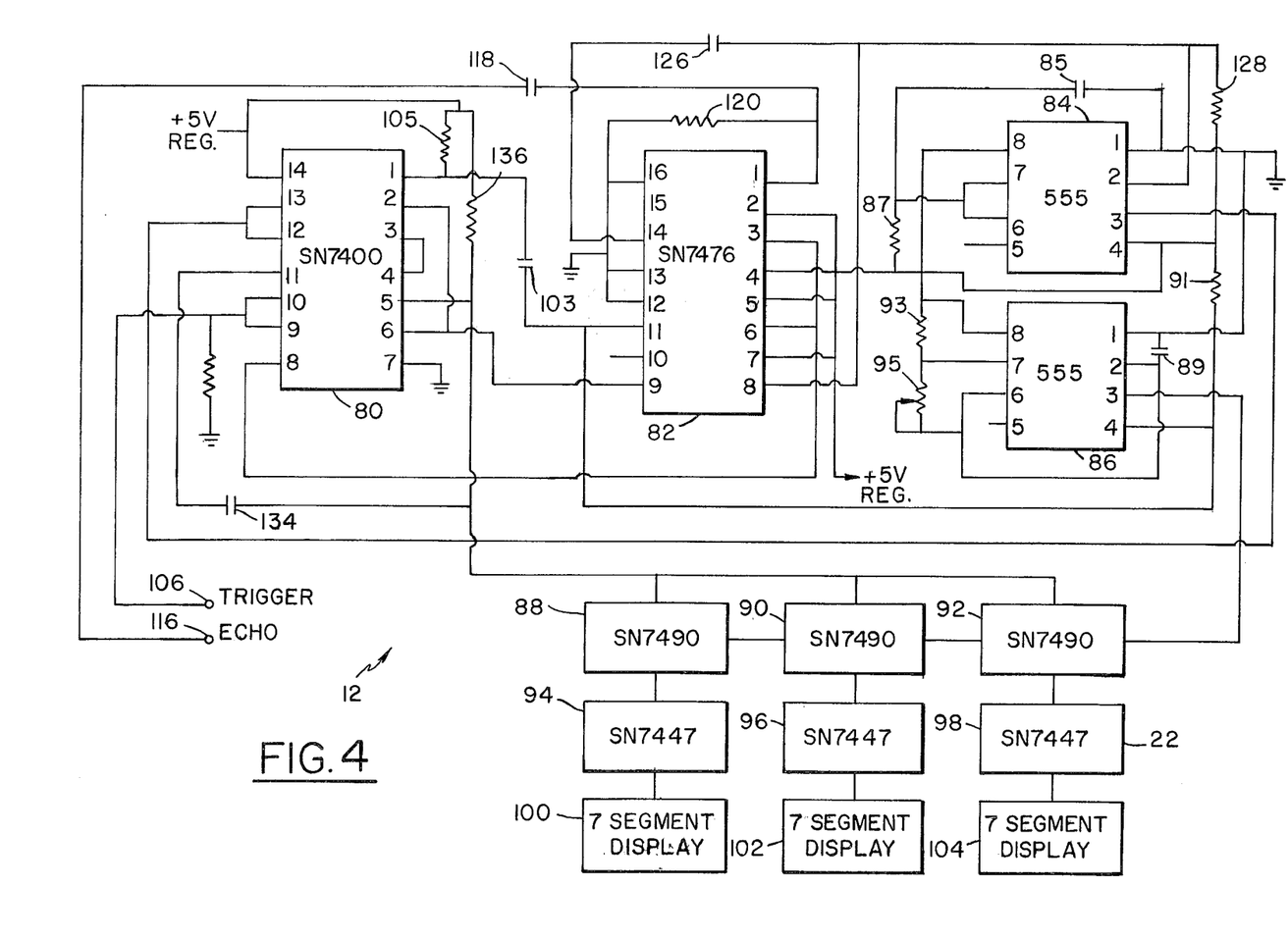
FIG. 4 is a schematic diagram of depth sounder structure constructed in accordance with the block diagram of FIG. 3, utilizing integrated circuit techniques.

In the preferred embodiment of the invention illustrated in FIGS. 3 and 4, a signal processor 12 is shown in conjunction with digital display structure 22.

The signal processor 12, as shown in FIG. 3, includes an inverting circuit 46, a J-K flip-flop circuit 48, differentiator circuit 50, a display timing circuit 51 including a one-shot multivibrator 52, invverter 54 and differentiator 55, a one and only one circuit 57 including a bi-stable flip-flop circuit 58, and a J-K flip-flop circuit 56, and timing oscillator 60, connected as shown.

The digital display circuit 22 includes binary coded decimal counter circuits 62, 64 and 66, decoder circuits 68, 70 and 72, and display circuits 74, 76 and 78.

In operation of the signal processor circuit 12, as shown in FIG. 3, a transmitted positive ultrasonic sonar signal of its trigger signal is passed from input terminal 45 through the inverter 46 to provide a negative transmitted signal at the clear input to the J-K flip-flop circuit 48. Since the clear input overrides all other control signals in the J-K flip-flop, the spillover of the transmitted pulse appearing on the echo signal line to the clock input is effectively ignored and discarded. The first negative going received echo signal from the corresponding transmitted signal, at input terminal 47, is then utilized to clock the J-K flip-flop circuit 48 to provide a square wave output signal from the flip-flop circuit 48 having a pulse width representative of the distance traveled by the sonar wave.

The square wave output from the J-K flip-flop circuit 48 is differentiated in the differentiator circuit 50 to provide positive going trigger pulses in time with the transmitted main sonar pulses and negative going trigger pulses in time with the corresponding first received echo signals at the sonar 20.

The negative going trigger pulses, corresponding to the received echoes, from the differentiator 50 are used to trigger the one-shot multivibrator 52 of the display timing circuit 51. The trigger will occur only if an echo appears and ultimately is utilized to zero the counter circuits. The one-shot multivibrator 52 provides a square wave output of approximately a two-second duration on being triggered. The output square wave of the multivibrator 52 is inverted in the inverter 54 and differentiated in differentiator 55 to provide negative going trigger pulses in time with the first received echo signal at approximately two-second intervals.

The negative going trigger pulses are used to initiate an output from the bi-stable flip-flop circuit 58 of the one and only one circuit 57 to enable the J-K flip-flop 56 of circuit 57. The J-K flip-flop 56 is then clocked by the first following trigger pulse from the inverter 46 in time with the transmitted main signal from the sonar to initiate a square wave output pulse from flip-flop 56 until the first subsequent negative going trigger signal from differentiator 50 representing the first received echo is applied to the clear input of flip-flop 56. This first subsequent negative going trigger signal clears the J-K flip-flop circuit 56 to terminate the output signal from flip-flop 56. The output signal from the flip-flop 56 is differentiated and re-sets the flip-flop 58. The square wave signal output from flip-flop 56 turns on the timing free-running multivibrator oscillator 60.

The timing oscillator 60 provides stable clock signals during the time it is turned on; that is, during the occurrence of the square wave output signal from the flip-flop 56. The timing oscillator 60 may be designed with a frequency related to the time of travel of the ultrasonic wave of the sonar in the water such that one cycle will equal one foot, for example, so that the digital pulses emanating from the oscillator 60 are directly related to a numerical display in feet or fathoms as desired.

For example, if the frequency of the oscillator 60 is set at 2,357.5 cycles per second, which corresponds to a period of oscillation equal to the time it takes transmitted sound to travel out and back through one foot of water; each cycle of the oscillator represents one foot of depth. Thus, the elapsed time for a pulse to travel 10 feet to the bottom of a body of water and back to a depth sounder (i.e., 20 foot travel) at 4715 feet per second would be 0.00424178 sec which is equal to 10 cycles of a 2,357.5 cycle per second oscillation.

The bi-stable flip-flop 58 will not again set the J-K flip-flop 56 until the timing display circuit 51 has timed out and a subsequent echo signal is received from the sonar. The square wave output from the J-K flip-flop 56 will thus have a duration equal to the time between a transmitted sonar pulse and the first corresponding sonar echo received, will have a signal only if echoes are being received, and then only approximately every two seconds.

The pulse repetition frequency of the output pulse from the J-K flip-flop 56 is determined by the setting of the display timing circuit 51 and may be, for example, approximately two seconds. Shorter periods may have a tendency to provide too frequent presentation of readings on the digital indicator structure 22, causing numbers to blur or causing confusion, thus requiring the inclusion of the timing circuit 51 and one and only one circuit 57 in the signal processor shown in FIGS. 3 and 4. The one and only one circuit also permits the counter to read zero when no echo is being received.

The display circuit 22, as shown in FIG. 3, includes the three binary coded counters 62, 64 and 66 which are reset to zero by the timing circuit 51 at the start of each timing period; that is, by the negative going trigger signal from the differentiator 55 of the timing display circuit 51. The counters 62, 64 and 66 then provide a binary coded decimal count determined by the timing oscillator 60 between the time of transmission of a main sonar signal and the receipt of a first reflected sonar echo signal. The binary count from the counters 62, 64 and 66 are decoded by the decoders 68, 70 and 72, respectively, and a three-digit display of depth is then provided by the display means 74, 76 and 78.

Figure 5:
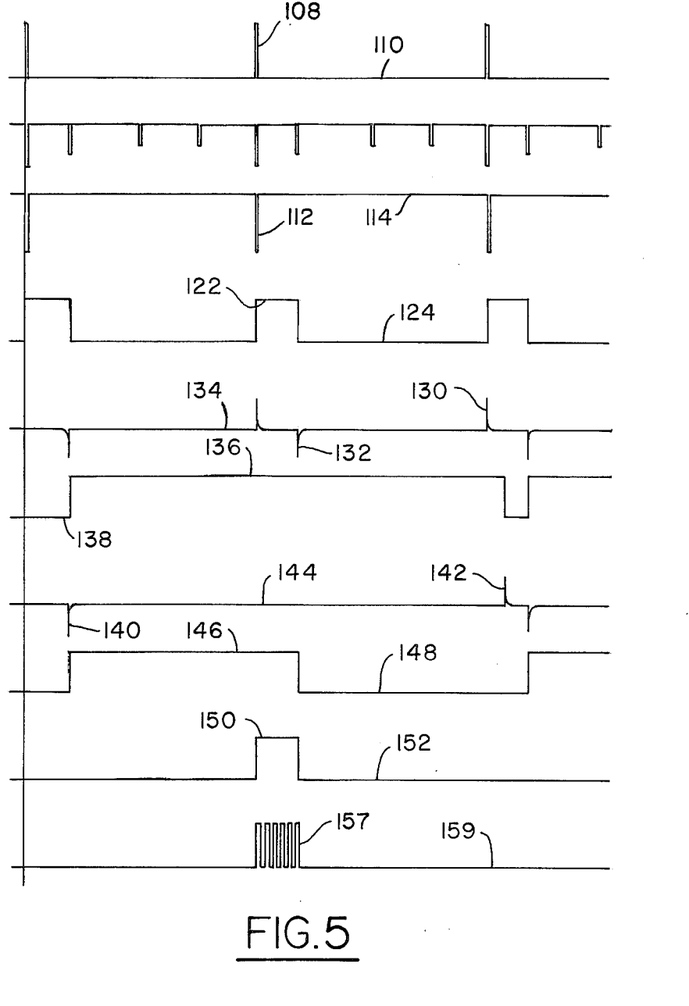
FIG. 5 illustrates wave shapes useful in explaining the operation of the depth sounder structure illustrated in FIGS. 3 and 4, in accordance with the method of the invention.

Referring more specifically to FIG. 4 and the wave forms of FIG. 5, the signal processor 12 is shown schematically constructed of integrated circuits 80, 82, 84 and 86. The display means 22 shown in FIG. 4 in block diagram form is implemented by integrated circuits 88, 90, 92, 94, 96, 98, 100, 102 and 104.

The integrated circuit 80 is an SN 7400 quadruple positive NAND gate. Integrated circuit 82 is an SN 7476 dual JK master slave flip-flop with pre-set and clear. Integrated circuit 84 is a 555 timer connected as a one-shot multivibrator, while integrated circuit 86 is an identical 55 timer connected as a free-running gated astable multivibrator oscillator. Integrated circuits 88, 90 and 92 are SN 7490 decade counters. Integrated circuuits 94, 96 and 98 are SN 7447 binary coded decimal to seven segment decoder drivers, while integrated circuits 100, 102 and 104 are incandescent, seven bar, digital display circuits. All of the integrated circuits SN 7400, SN 7476, SN 7490 and SN 7447 are generic types and are commercially available from Texas Instruments, inc., Dallas, Texas, and many other manufacturers. The 555 timers are available from Signetics Corporation, Sunnyvale, California, and other manufacturers. The display circuits are available from Radio Shack Corporation, Boston, Massachusetts as well as other manufacturers and may also be light emitting diodes (LED's), fluorescents, liquid crystal, or other similar seven bar displays.

As shown in FIG. 5, the positive going trigger pulse for the transmitted main signal 108 on line 110 from a ship's sonar depth sounder is provided at input terminal 106 in FIG. 4. The posittive going signal 108 is presented to pins 9 and 10 of integrated circuit 80 and is provided in inverted form at pin 8 of integrated circuit 80 as wave form 112, on line 114 in FIG. 5.

The negative going signal from pin 8 of integrated circuit 80 is passed to the clear input pin 3 of the upper J-K flip-flop of integrated circuit 82. The output from pin 14 of the integrated circuit 82 is thus caused to go high.

On receipt of the first corresponding echo from the ship's sonar at terminal 116, the negative going signal is passed through blocking capacitor 118 to the clock pin 1 of the upper portion of the integrated circuit 82 to cause the output on pin 14 of integrated circuit 82 to return low. Thus, the output of pin 14 of integrated circuit 82 is the square wave 122 of line 124 in FIG. 5.

The square wave output of pin 14 of integrated circuit 82 is then differentiated by the differentiator 50 formed by capacitor 126 in conjunction with resistor 128 to provide positive trigger signals 130 and negative trigger signals 132 as shown on line 134 of FIG. 5. These trigger signals are passed to the clear input 8 of the bottom J-K flip-flop of the integrated circuit 82 and to the trigger input pin 2 of the integrated circuit 84.

The negative going trigger signal, which corresponds to the first echo received, drives the output of the integrated circuit 84 on pin 3 high. The output of the integrated circuit 84 will, due to the circuit constants of capacitor 85 and resistor 87 of the circuit 84, remain high for a predetermined time as, for example, two seconds. The output of the integrated circuit 84 on pin 3 will thus be the elongated square wave signal 136 illustrated on line 138 in FIG. 5.

The output square wave 136 from pin 3 of the integrated circuit 84 is passed to pins 12 and 13 of the integrated circuit 80 where it is inverted to provide a negative going square wave output at pin 11 of integrated circuit 80. This negative going square wave output of integrated circuit 80 on pin 11 is differentiated in the differentiator 55 formed by capacitor 134 in conjunction with resistance 136 and in differentiated form provides negative trigger pulses 140 and positive trigger pulses 142 shown on line 144 in FIG. 5 which are passed to pin 5 of the integrated circuit 80 and to the clear inputs of the counters, integrated circuits 88, 90 and 92, to zero then to get ready for the next count.

The output on pin 6 of the hi-stable multivibrator portin of the integrated circuit 80 is caused to go high by the negative trigger signal 140 and is passed to the J input, pin 9 of the lower J-K flip-flop of the integrated circuit 82 to prepare the J-K flip-flop for flipping at the occurrence of the next transmitted pulse.

On the next negative going main sonar pulse 112 at pin 6 of the integrated circuit 82, the output on pin 11 of the integrated circuit 82 will go high and will remain high until the subsequent negative going portion 132 of the differentiated signal 122 appears at pin 8, whereby the output at pin 11 of the integrated circuit 82 is driven low again.

The output of pin 11 of integrated circuit 82 is the square wave 150 of line 152 in FIG. 5. The square wave 150 has a duration equal to the time between the transmitted main pulse of the sonar and the first received echo.

The square wave output 150 is differentiated by capacitor 103 and resistor 105 and is fed to pin 1 of the bi-stable flip-flop of the integrated circuit 80 to cause the output signal from pin 6 thereof to return low in time with the first echo and thus close the gate provided by the flip-flop 56 of integrated circuit 82. The gate provided by the bi-stable flip-flop portion of the integrated circuit 80 will then remain closed until opened again by the first echo pulse received after timing out of the integrated circuit 84, which takes approximately two seconds.

The output square wave 150 from pin 11 of integrated circuit 82 is also fed to pin 4 of the integrated circuit 86 where it is utilized to gate or enable the oscillator formed by the integrated circuit 86 and capacitor 89 and resistors 91, 93 and 95 which provides the individual clock signals 157 as shown on line 159 of FIG. 5. The integrated circuit 86 will be deenergized or disabled after the gating signal provided by the square wave 150 is closed.

Thus, the number of cycles of the integrated circuit 86 which are the digital clock signals 157 may be counted as a measure of the depth of the body of water, since the number is proportional to the time required for the ultrasonic signal of the sonar 20 to go to the bottom of a body of water and be reflected back to the sonar receiver because the gate provided by square wave 150 is opened in time with a transmitted main sonar signal and is closed in time with the first reflected echo thereof.

As the enabling gate formed by the integrated circuit 80 is opened, the signal from pin 11 of the integrated circuit 80 is also fed to the decimal counters 88, 90 and 92 to clear the counters. Subsequently during the time that the oscillator of integrated circuit 86 is oscillating, the counters are counting the individual cycles. The count in binary coded decimal form is decoded in the decoders 94, 96 and 98 and ultimately displayed in the display circuits of the integrated circuits 100, 102 and 104.

It might be assumed that the square wave signal 122 could be used directly to start and stop and oscillator of integrated circuit 86. However, most sonar equipment provides transmitted main pulses every one or two hundredths of a second, or oftener. Thus, it is necessary to include the display timing circuit 51 shown in FIG. 3 and the one and only one circuit 57 shown in FIG. 3 in the circuit to insure that the timing oscillator is turned on for the correct length of time as determined by a single transmitting pulse and the first reflected pulse and then only once, approximately every two seconds, so as to prevent unintelligible fluctuation of the display structure by too rapid changing of the display readings. These circuits also insure that if no echo is received that the counter will read zero.

Figure 6:
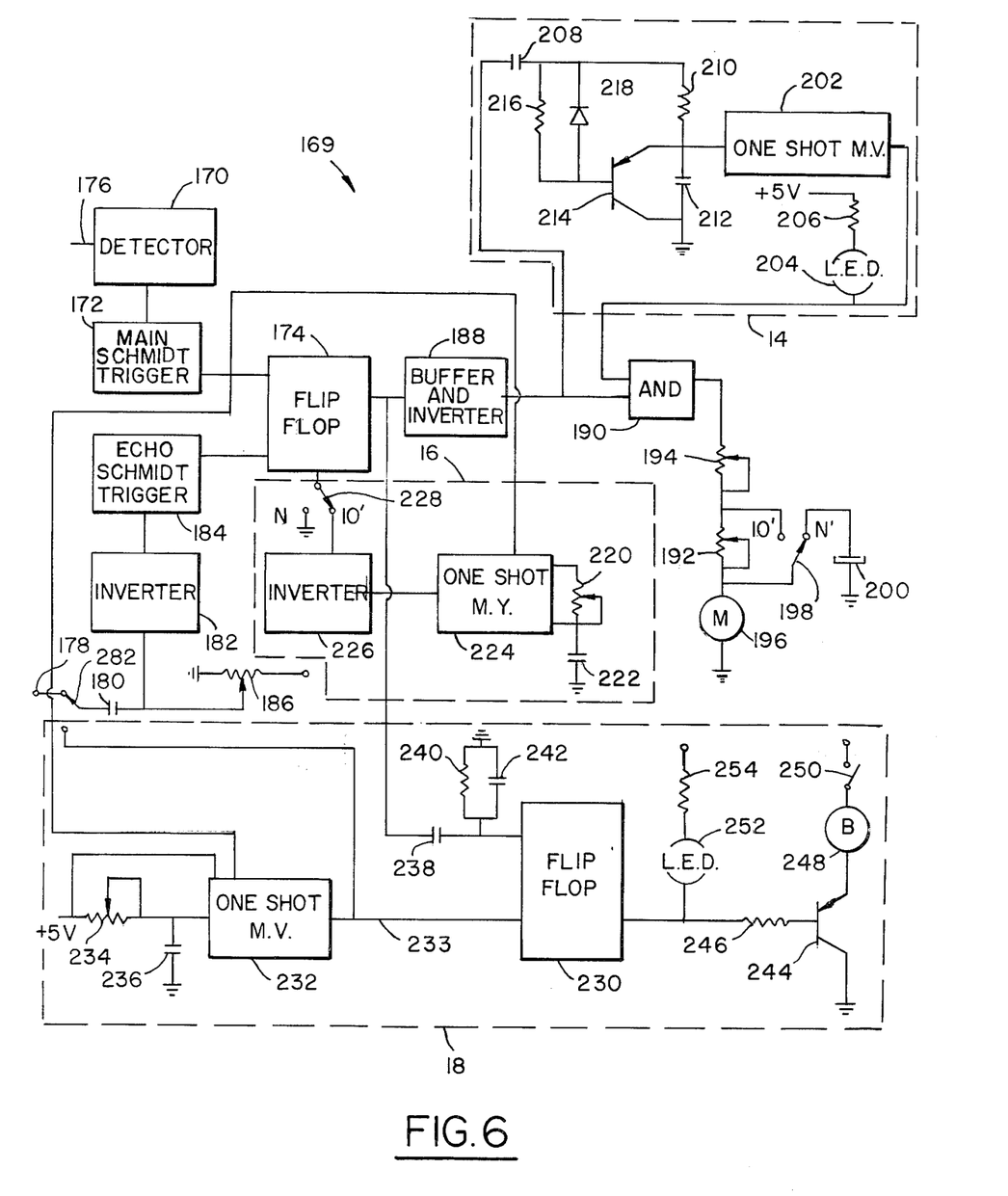
FIG. 6 is a partly block, partly schematic diagram of another embodiment of the depth sounder structure of the invention for performing the method of the invention.

The embodiment 169 of the invention illustrated in FIG. 6 demonstrates how signals may be processed to operate a master display. It shows how the transmitted main sonar signal at terminal 176 may be used by first passing it through a detector 170 so that the envelope of the high frequency pulse is detected, thus yielding a single positive signal at the main Schmitt trigger circuit 172 of a sufficient magnitude to trigger circuit 172. If the trigger for the main pulse is used, detector may be eliminated. The negative going output siganl of the main Schmitt trigger circuit 172 is used to set a flip-flop 174 and thus initiate a negative going square wave output therefrom.

Subsequently, the first echo signal of the corresponding transmitted main sonar signal is received at terminal 178 and is passed through capacitor 180 into the inverter 182, with switch 282 positioned as shown. The output of the inverter 182 is then a positive going echo signal fed to the echo Schmitt trigger circuit 184. The positive output signal of the echo Schmitt trigger circuit 184 is used to clock the flip-flop 174 to terminate the output square wave signal therefrom.

Resistor 186 is used to set the sensitivity of the circuit 169 with regard to the echo signals so that the flip-flop 174 will be triggered by even a weak echo signal of the main sonar transmisssion by bringing its quiescent point down closer to the flip over point.

The output negative square wave signal from the flip-flop 174 is fed to a buffer and inverter circuit 188 from which it is passed into the AND circuit 190 made up of two NAND gates wired as an AND circuit. As long as the echo signals are not lost; that is, as long as a square wave signal is received out of the buffer and inverter circuit 188, and as long as a positive signal is received from lost echo circuit 14, the AND gate will be open and a square wave signal having a pulse width proportional to the depth of the body of water (the time it takes an ultrasonic signal to pass between a sonar transmitter and back to the sonar receiver, after reflecting off the bottom of the body of water) will be passed through resistors 192 and/or 194. These square wave signals are integrated by the display meter 196. Meter 196 may thus display the depth of the body of water, as desired. Both the resistors 192 and 194 are made variable, whereby the full scale of the meter may be set so that the readings in terms of water depth corresponding to the sonar scale range being used may be accomplished.

The switch 198, ganged with switch 288, is provided to include the capacitor 200 in the meter circuit for long ranges such as depths greater than a selected depth, as for example, ten feet, with the switch 198 in the N or normal position. With the switch 198 in the 10-ft. position, the resistor 192 is effectively shorted out of the circuit and the meter is conditioned to indicate depths ten feet or less on an expanded scale without the capacitor 200 in the meter circuit.

Should the square wave signal from the buffer and inverter 188 be lost; that is, should the echo signal be lost, the re-triggerable one-shot multivibrator 202 of the lost echo circuit 14 will provide a signal output to the AND gate 190 which will prevent any output from the AND gate 190, so that the meter 196 will read zero depth, and the light-emitting diode 204 will be illuminated through the resistor 206 to provide an indication of the loss of the echo signal.

The multivibrator 202 with transistor 214 is a retriggerable multivibrator and is caused to have a high output on receipt of the negative pulse of the differentiated square wave signal from the buffer inverter 188 through capacitor 208. Normally, the multivibrator 202 would turn off after a time determined by a time constant set by the resistance 210 and the capacitor 212 and the output of the multivibrator 202 would again go low. However, with the transistor 214 connected across the capacitor 212, each time an echo signal is sensed across capacitor 208 and the resistor 216 and diode 218 connected in parallel, as shown, the transistor 214 will turn on to discharge the capacitor 212 and cause the multivibrator 202 to continue its high output. As long as the echo signal is not lost, the output of the multivibrator will thus stay high, permitting the square wave from the buffer inverter 188 to pass through the AND gate 190. Should the echo disappear, the lost echo circuit 14 will return to a low output, closing the AND gate 190 and the meter will read zero.

When the depth on the meter 196 is less than a predetermined depth, in the present instance ten feet; which particular depth is set in the expanded scale pedestal circuit 16 by the variable resistor 220 in conjunction with the capacitor 222 which determine the length of the output of the one-shot multivibrator 224; the signal from the buffer and inverter 188 which triggers the one-shot multivibrator 224 is passed through the inverter 226 to switch 228. With switch 228 in the N or normal position, the meter 196 will read normally on a meter full scale equivalent of the range scale being used on the sonar. At this time, the switch 228 and the switch 198, which may be mechanically ganged together, are transferred to the ten foot position. The meter 196 will then read the actual depth less than ten feed, ten feet now being full scale, on an expanded scale, until the first echo received indicates a depth greater than ten feet, at which time the meter 196 will read zero and diode 204 will light and the switches 228 and 198 may be returned to the normal position.

The depth alarm circuit 18, as shown in FIG. 6, includes the dual D-type edge triggered flip-flop 230 and the one-shot mutivibrator 232.

In operation of the depth alarm circuit 18, the one-shot multivibrator 232 is triggered by the output of the main Schmitt trigger circuit 172, concurrent in time to the transmitted signal and will provide an output for a time determined by the variable resistance 234 and capacitor 236 in combination. The period of time can be made equal to any depth, for example five feet, below which an alarm is desired to be given. The output signal from multivibrator 232 on conductor 233 will thus be an alarm pedestal.

This output signal, when applied to the flip-flop 230, will change the state of the output from the flip-flop 230, from low to high and remain high if the square wave output from the flip-flop 174 across the capacitor 238 and the resistor 240 and capacitor 242 in parallel has terminated prior to the termination of the signal from the multivibrator 232. If the square wave output of flip-flop 174 terminated after the output of multivibrator 232, the output of flip-flop 230 will change from high to low and remain there.

On provision of a high output signal from the flip-flop 230, the transistor 244 is turned on through resistor 246 to energize the buzzer 248 with the switch 250 closed. At the same time, the light-emitting diode 252 will be energized through the resistor 254 to indicate visually concurrently with the audible signal of buzzer 248 the registering of a depth less than the predetermined five feet set in. The alarm will continue until the square wave out of the flip-flop 174 is terminated due to an echo signal reflected from the bottom of a body of water at a distance greater than five feet.

If switch 282 is placed in the position alternate to that shown, the echo signals from the sonar will be disconnected and replaced by a false echo generated from the trailing edge of the alarm multivibrator 232, causing the meter to read the alarm depth being set in by resistor 234.

Figure 7:
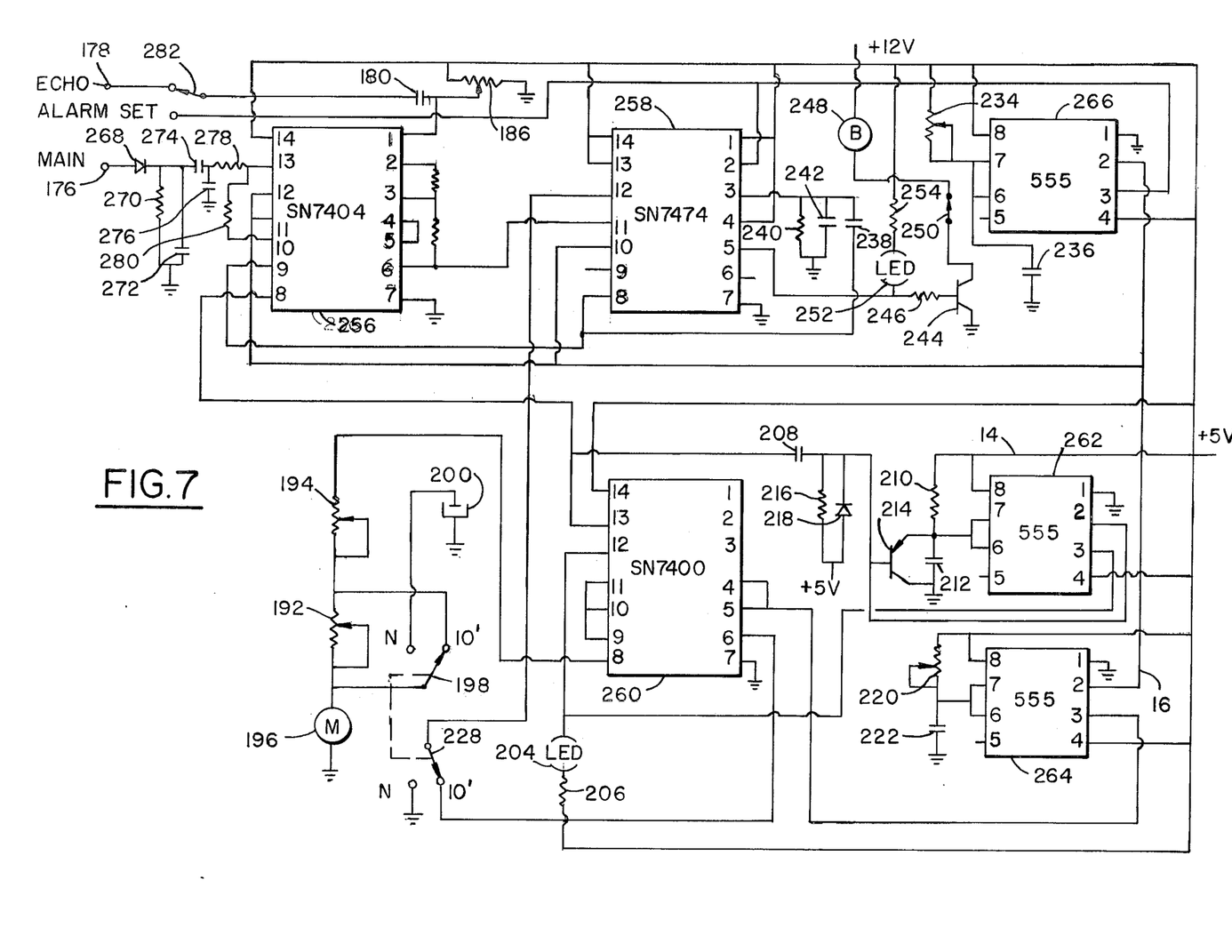
FIG. 7 is a schematic diagram of the depth sounder structure constructed in accordance with the diagram of FIG. 7, utilizing integrated circuit techniques.

The circuit of FIG. 6 is shown specifically implemented by means of integrated circuits in FIG. 7. FIG. 7 will be considered in detail in conjunction with the wave forms illustated in FIG. 8.

The circuit of FIG. 7 includes the integrated circuits 256, 258, 260, 262, 264 and 266. Integrated circuit 256 is an SN 7404 hex inverter; integrated circuit 258 is an SN 7474 dual D-type edge triggered flip-flop; integrated circuit 260 is an SN 7400 quadruple 2-input positive NAND gate, and integrated circuits 262, 264 and 266 and 555 timers connected as one-shot multivibrators. As indicated previously, the integrated circuits 256, 258 and 260 are obtainable from Texas Instruments and other manufacturers, while the integrated circuits 262, 264 and 266 are obtainable commercially from Signetics Corporation and other manufacturers.

Figure 8:
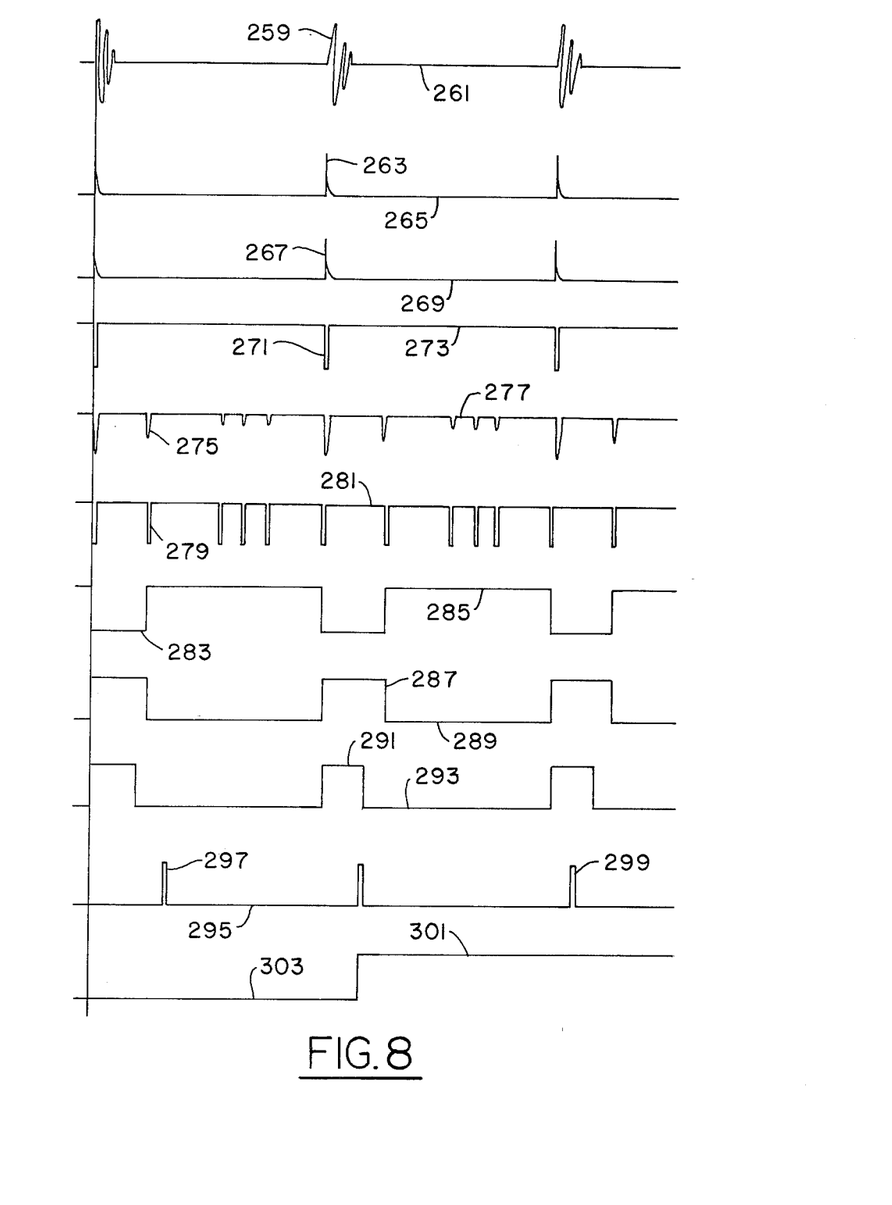
FIG. 8 illustrates wave shapes useful in explaining the operation of the depth sounder structure illustrated in FIGS. 7 and 8, in accordance with the method of the invention.

In operation of the circuit of FIG. 7, the transmitted main sonar signal 259 or its trigger 263 as shown on lines 261 and 265 of FIG. 8 is fed to input terminal 176 and is passed through the detector 170 shown in block form in FIG. 6 and including the diode 268, resistor 270 and capacitors 272, 274 and 276 and resistors 278 and 280 in FIG. 7, into pin 13 of the integrated circuit 256. The detected main sonar signal or its trigger 267 is shown on line 269 in FIG. 8. The output of the main Schmitt trigger portion 172 of the integrated circuit 256 on pine 11 and 12, is a negative going signal 271 shown on line 273 in FIG. 8, which is fed to pin 10 of integrated circuit 258 and to pin 2 of integrated circuits 264 and 266. The negative going signal on pin 10 of integrated circuit 258 initiates a negative going square wave output from the flip-flop 174, in FIG. 6, forming one side of integrated circuit 258, in FIG. 7. The negative going output signal 283 on pin 8 of circuit 258 is shown on line 285 in FIG. 8.

On subsequent receipt of a first echo signal 275, shown on line 277 of FIG. 8, corresponding to the transmitted main sonar signal, at the terminal 178, the first echo signal is passed through switch 282, which will be considered in more detail in conjunction with the depth alarm circuit 18 and through the capacitor 180 and across resistor 186, as indicated previously (which determines the sensitivity of the circuit to the echo received) to pin 1 of integrated circuit 256.

Pins 1 and 2 of the integrated circuit 256 are wired as inverter 182, wile pins 3-6 of the integrated circuit 256 are wired as echo Schmitt trigger circuit 184. The inverted output from pin 2 of integrated circuit 256 is fed to pin 3 of the Schmitt trigger circuit 184, in FIG. 6, of the integrated circuit 256, in FIG. 7, and the output signals 279 are shown on line 281 of FIG. 8 on pin 6 of the integrated circuit 256 are fed to pin 11 of the left hand flip-flop portion 174, in FIG. 6, of the integrated circuit 258, in FIG. 7. The positive signal at pin 11 of integrated circuit 258 will terminate the square wave output 283 of this flip-flop shown on line 285 of FIG. 8 which is negative going at pin 8 of integrated circuit 258 in FIG. 7.

The negative going square wave 283 from pin 8 of the integrated circuit 258, as shown on line 285 in FIG. 8, is fed to pin 9 of the integrated circuit 256, pins 8 and 9 of which are wired as buffer and inverter 188. The output signal from pin 8 of integrated circuit 256 is then a positive going square wave 287 on line 289 as shown in FIG. 8. The positive going square wave 287 of pin 8 of integrated circuit 256 is fed to pin 13 of the integrated circuit 260, pins 8-13 of which are wired as AND gate 190 in FIG. 6.

Providing the proper signal is present at pin 12 of the AND gate portion of integrated circuit 260, as will be considered subsequently, the square wave signal on pin 8 of integrated circuit 256 is passed through integrated circuit 260 and subsequently out through pin 8 thereof to the resistors 194 and 192 and the meter 196 where it is integrated to provide a meter display of the depth of the body of water indicated by the time between the transmission of the main sonar signal and the receipt of the first reflected corresponding echo in conjunction with the capacitor 200 and the setting of the switch 198 to N (normal) as indicated previously.

The integrated circuit 262 includes the one-shot multivibrator 202 of the lost echo circuit 14. The signal 287 from pin 8 of integrated circuit 256 is fed through and differentiated by capacitor 208 and resistor 216 in parallel with diode 218 to integrated circuit 262 to trigger the multivibrator formed by integrated circuit 262 with the negative pulse produced by differentiation thereof. As previously indicated, the multivibrator 262 thus initiates a positive or high output on pin 3 of circuit 262 to pin 12 of the AND portion of the integrated circuit 260.

As long as the high output from integrated circuit 262 is maintained at pin 12, the square wave output of circuit 256 arriving at integrated circuit 260 will be provided out of pin 8 of integrated circuit 260 to the resistors 192 and 194 and the depth of the body of water will be registered on the integrating meter 196 in conjunction with the capacitor 200 in accordance with the setting of the switch 198 to normal. When the signal on pin 12 of integrated circuit 260 goes low; that is, when the multivibrator 202 of the integrated circuit 262 times out, the output at pin 8 of integrated circuit 260 will go to zero and the meter 196 will thus read zero. At the same time, the light-emitting diode 204 will be energized to indicate that the echo signal from the sonar has been lost.

The integrated circuit 262 would normally go low on timing out in accordance with the values of the resistance 210 and capacitance 212. However, as indicated previously, the transistor 214 is provided across the capacitor 212 and discharges the capacitor 212 each time an echo signal is received from pin 8 of integrated circuit 256 through capacitor 208 preventing circuit 262 from timing out. Thus, the meter 196 will read zero when the echo signal is lost, when an echo signal is not provided from integrated circuit 256.

The scale expand circuit 16 as shown in FIG. 7 includes the integrated cifcuit 264, which is multivibrator 224 of FIG. 6. The integrated circuit 264 is connected to be triggered by the negative going signals 271 of the main Schmitt trigger circuit 172 from pins 11 and 12 of integrated circuit 256. The integrated circuit 264 will then provide a high output for a time determined by the setting of the resistor 220 in conjunction with the capacitor 222, as shown by square wave 291 on line 293 in FIG. 5.

The high output of the integrated circuit 264 is provided from pin 3 to pins 4 and 5 of the right hand portion of the integrated circuit 260 which are, together with pins 6 and 7, connected as inverter 226. The inverted output from pin 6 of integrated circuit 260 is fed through switch 228 in the ten foot position to pin 12 of the integrated circuit 258.

If resistor 220 is set to yield a signal on pin 12 equivalent to ten feet, the output appearing at pin 8 of the flip-flop on the left hand side of integrated circuit 258 will go low and stay there any time the echo signal occurs prior to a time indicating a depth of water of ten feet or less, beginning concurrently with the transmitted pulse and ending with an echo of ten feet or less as shown at the right on line 295 in FIG. 8, by signal 299. Should the echo signal appear at a time indicating a depth of water of greater than ten feet, as shown at the left on line 295 by signal 297 in FIG. 8, the output from pin 8 of circuit 258 will go high and remain there and the meter 196 will go to zero, since there will be no output on the pin 8 of integrated circuit 256 and thus no input into integrated circuit 260. Since the echo signal will appear to be lost, light 252 will light, as will be seen subsequently.

It is then necessary to manually switch the switch 228 from the ten foot position to normal, at which time the signal on the pin 12 of integrated circuit 258 is returned to ground, which will allow an output from integrated circuit 258 regardless of the depth of the body of water, provided the echo is at a depth within the scale range of the sonar to which the meter-repeater is attached. In reverse, the switch 228 is returned to the ten foot position when a depth under ten feet is indicated.

The depth alarm circuit 18, as shown in FIG. 7, includes the integrated circuit 266 and the right hand side of the integrated circuit 258 including pins 1-6. The integrated circuit 266 is connected as one-shot multivibrator 232, the length of the output signal from which is determined by the variable resistance 234 and capacitor 236. The integrated circuit 266 is also triggered by the main transmitted pulse from pins 11 and 12 of the integrated circuit 256 via pin 2 of integrated circuit 266.

The output of integrated circuit 266, as shown at 291 on line 293 in FIG. 8, is provided on pin 3 to pin 2 of the flip-flop formed by the right hand side of the integrated circuit 258 on pin 2. The output signal from pin 8 of the left hand side of the integrated circuit 258 is differentiated by the circuit including the capacitor 238 and the resistor 240 and capacitor 242 and is provided to pin 3 of the right hand side of integrated circuit 258.

The flip-flop provided on the right hand side of integrated circuit 258 is such that if the echo signal 297 on line 295 in FIG. 8 appears at pin 3 subsequent to the timing out of the integrated circuit 266, no output will appear at pin 5 of the integrated circuit 258 and no alarm will be given. If, however, the first echo signal as indicated by the signal 299 on line 295 in FIG. 8 occurs before the integrated circuit 266 has timed out; that is, before the alarm depth, such as, for example, five feet, set by adjustment of resistor 234, is reached, which would indicate a depth of less than the desired depth for sounding the alarm, an output signal 301 on line 303 in FIG. 8 at pin 5 of integrated circuit 258 will go from low to high to cause the transistor 244 to be energized through the resistor 246. Consequently, the buzzer 248 will sound if the switch 250 is closed and the light 252 will be illuminated through resistor 254. Both the light 252 and the buzzer 248 provide an alarm to indicate that the depth of the water is less than a predetermined desired minimum. The alarm will automatically turn off when a depth greater than the alarm setting is again indicated by the time of return of the first echo of the main sonar pulse.

It will be noted that due to the inclusion of the switch 282 at the echo input terminal 178, that the setting of the desired depth at which the alarm will sound is easily accomplished by placing the switch 282 in the alarm set position, since the display meter 296 will display the depth at which the alarm will be triggered with the switch 282 in the alarm set position. That is to say, switch 282 disconnects the sonar echo signals and replaces it with the signal out of the multivibrator 232, FIG. 6. The trailing edge of this signal from multivibrator 232 becomes a false first echo signal at the alarm depth with the switch 282 in the alarm set position.

While a preferred embodiment of the invention and modifications thereof have been considered in detail, it will be understood that other embodiments and modifications are contemplated. For example, it will be readily understood that the depth alarm, lost echo, and scale expand circuits illustrated in FIGS. 6 and 7, in conjunction with the integrating meter type circuit and display, could be utilized in the digital type circuit and display illustrated in FIGS. 3 and 4. Further, it will be readily understood that the detector and main Schmitt trigger circuits 170, 172 of FIG. 6, as well as the inverter and echo Schmitt trigger circuits 182 and 184 of FIGS. 6 and 7, and the flip-flop 174 of FIGS. 6 and 7 could be substituted wholly or partially for similar elements 46 and 48 of FIGS. 3 and 4 as needed or desired. It is the intention to include all such embodiments and modifications as are defined by the appended claims without the scope of the invention.

I claim:

1. A depth sounder repeater structure for use in conjunction with shipboard sonar which shipboard sonar produces main transmitted pulses of high frequency energy and receives echo pulses from distant underwater objects the time between which is representative of an underwater distance, comprising a signal receiving circuit including a first inverter for receiving the main transmitted sonar pulses, a first multivibrator for receiving the output signal from the first inverter and the echo pulses for producing a square wave output signal, the pulse width of which is representative of the time between the main transmitted sonar pulse and the first corresponding echo signal, a first differentiator circuit for receiving the square wave signal and producing a positive and a negative going trigger signal in response thereto, a display timing circuit including a one-shot multivibrator for receiving the negative going trigger signal representative of the time of receipt of the echo signal operable to produce a second square wave output signal in response to the negative going trigger signal, and a second inverter circuit for inverting the second square wave signal, a differentiator connected to the second inverter for differentiating the inverted square wave output of the one-shot multivibrator to provide a display timing circuit trigger signal, a one and only one circuit including a third and fourth multivibrator, the third multivibrator being connected to the display timing circuit for receiving the display timing circuit trigger signal and operable on receipt of the display timing circuit trigger signal to prepare the fourth multivibrator to produce an output signal in response to the next following main transmitted sonar pulse through the first inverter, said fourth multivibrator being connected to receive the output signals from the first inverter and also being connected to receive echo input signals from the first differentiator operable to turn the fourth multivibrator off, said fourth multivibrator being operable on turning on to reset the third multivibrator so that the third multivibrator will not again prepare the fourth multivibrator to produce an output signal until the receipt of a further display timing circuit trigger signal, a timing oscillator, said fourth multivibrator being also operable to actuate the timing oscillator to produce periodic electric signals during the time the fourth multivibrator produces an output signal, and a display circuit including a plurality of binary coded decimal counters connected to receive the output impulses of the timing oscillator and to receive the display timing circuit trigger signal for resetting of the binary coded decimal counters, binary decoder structure connected to the binary coded decimal counters for decoding the binary coded decimal counter signals subsequent to the timing oscillator being shut off and a binary display circuit connected to the binary decoder circuits for providing a binary display of the distance between the sonar and the object which returned the first echo signal as represented by the electrical impulses from the timing oscillator in the time between a main sonar transmitted pulse and the corresponding first received echo pulse.

2. Depth sounder repeater structure for use in conjunction with shipboard sonar which shipboard sonar produces main transmitted pulses of high frequency electrical energy and receives echo pulses from distant underwater objects the time between which is representative of an underwater distance, comprising signal receiving circuit means for receiving a main sonar pulse and the first echo pulse corresponding thereto and producing a square wave electrical signal having a pulse width representative of the time between the reception of the main sonar pulse and the first echo pulse of the repeater structure, an output circuit for receiving the square wave signal and providing an indication representative of the distance between the sonar and a reflecting object producing the first corresponding echo pulse and further including a depth alarm circuit connected to the input circuit for providing an alarm when the depth indicated by the echo signal is less than a predetermined selected depth, said depth alarm circuit comprising a one-shot multivibrator connected to the input circuit for producing an output depth alarm pedestal, means for varying the depth alarm pedestal, a multivibrator for receiving the pedestal and a differentiated signal representative of the depth indicated by the echo signal from the input circuit and for providing an output when the depth indicated by the echo signal is less than the depth alarm pedestal.

3. Depth sounder repeater structure for use in conjunction with shipboard sonar producing a main pulse and receiving echo pulses from distant underwater objects, comprising an input circuit including a first flip-flop, a detector connected to the shipboard sonar for receiving transmitted main sonar pulses and detecting the envelope of the pulses, a main Schmidt trigger circuit connected to receive the output of the detector to provide a first input to the flip-flop, a first inverter connected to receive the echo pulses of the transmitted main sonar pulses, an echo Schmidt trigger circuit connected to the first inverter and to the multivibrator to provide a second input to the first flip-flop whereby the output of the first flip-flop is a square wave signal representative of the distance traveled by a main sonar pulse to a first reflecting underwater object, a buffer and inverter connected to the first flip-flop to receive the square wave output signal therefrom, and AND gate receiving the output of the buffer and inverter on one input thereto, variable, first and second resistors connected in series and connected to the AND circuit for receiving the output thereof, and an integrating indicator connected to receive the signal from the AND gate through the first and second resistors, a first switch having a first portion connected in one position to bypass the second resistor, a first capacitor, said first switch, first portion being operable in said one position to bypass the second resistor, and in another position to connect the first capacitor in parallel with the integrating meter, a lost echo circuit connected between the buffer and inverter and another input to the AND circuit comprising a second capacitor and third resistor connected in series, a diode connected in parallel with the third resistor, a first transistor having a base, emitter and collector, said base being connected to the first resistor of the end thereof away from the second capacitor, a fourt resistor connected at one end to the emitter of the transistor, and connected between the second capacitor and third resistor at the other end, a third capacitor connected across the emitter and collector of the first transistor, a first one-shot multivibrator connected between the other input to the AND gate and the emitter of the transistor, a fifth resistor, and a light emitting diode connected between a source of power therefor and the other input to the AND gate through the fifth resistor, a scale expansion circuit including a second one-shot multivibrator connected to the output of the main Schmidt trigger circuit, a variable sixth resistor and a fourth capacitor connected in series connected to the one-shot multivibrator for determining the time of timing out of the second one-shot multivibrator, a second inverter having an input connected to the output of the second one-shot multivibrator and a second portion of the first switch operable in one position thereof to connect the output of the second inverter to the flip-flop and in the other position thereof to connect the flip-flop to ground, and a depth alarm circuit including a third one-shot multivibrator connected to the main Schmidt trigger circuit and through a variable seventh resistor and across a fifth capacitor to a power source operable to time out in accordance with the values of the seventh resistor and fifth capacitor, a second flip-flop for receiving the output of the depth alarm third one-shot multivibrator and for receiving the output of the first flip-flop of the input circuit through a sixth capacitor and across a parallel connected eighth resistor and seventh capacitor, a depth alarm second transistor having a base connected through a ninth resistor to the output of the depth alarm second flip-flop and an emitter-collector circuit connected in series with an alarm and an alarm switch, and a light emitting diode connected in parallel with the ninth resistor and the base emitter circuit of the second transistor.

4. Structure as set forth in claim 3, and further including an eigth capacitor and a variable tenth resistor in an input circuit to the first inverter, and a second switch for switching the input to the first inverter between the echo signal of the main sonar and the output signal of the third one-shot multivibrator of the depth alarm circuit for providing an accurate indication of setting of the depth alarm circuit.

5. Depth sounder repeater structure for use in conjunction with shipboard sonar which shipboard sonar produces main transmitted pulses of high frequency electrical energy and receives echo pulses from distant underwater objects the time between which is representative of an underwater distance comprising signal receiving circuit means for receiving a main sonar pulse and the first echo pulse corresponding thereto and producing a square wave electrical signal having a pulse width representative of the time between the reception of the main sonar pulse and the first echo pulse by the repeater structure, an output circuit for receiving the square wave signal and providing an indication representative of the distance between the sonar and a reflecting object producing the first corresponding echo pulse and comprising a scale expansion circuit including a one-shot multivibrator connected to the input circuit to receive a signal representative of the main sonar pulses, an inverter circuit connected to the one-shot multivibrator portion to invert the output of the one-shot multivibrator, and means for feeding the inverted signal from the one-shot multivibrator to the input circuit after a predetermined selectable time representative of the predetermined depth, and means within the input circuit for inhibiting echo signals from passing through the input circuit if the echo signals reflect a depth less than the predetermined depth, and a manually operable switch having portions connected in the scale expanding circuit and portion connected in the output circuit for producing a full scale reading in the output circuit indicating a depth less than the predetermined depth, and for producing full scale reading for depths of the predetermined depth in alternate settings thereof.

6. Depth sounder repeater structure for use in conjunction with shipboard sonar which shipboard sonar produces main transmitted pulses of high frequency electrical energy and receives echo pulses from distant underwater objects the time between which is representative of an underwater distance comprising signal receiving circuit means for receiving a main sonar pulse and the first echo pulse corresponding thereto and producing a square wave electrical signal having a pulse width representative of the time between the reception of the main sonar pulse and the first echo pulse by the repeater structure, an output circuit for receiving the square wave signal and providing an indication representative of the distance between the sonar and a reflecting object producing the first corresponding echo pulse and comprising a scale expansion circuit including a one-shot multivibrator connected to the input circuit to receive a signal representative of the main sonar pulses, an inverter circuit connected to the one-shot multivibrator portion to invert the output of the one-shot multivibrator, and means for feeding the inverted signal from the one-shot multivibrator to the input circuit after a predetermined selectable time representative of the predetermined depth, and means within the input circuit for inhibiting echo signals from passing through the input circuit if the echo signals reflect a depth less than the predetermined depth, and a manually operable switch having portions connected in the scale expanding circuit and portions connected in the output circuit for producing a full scale reading in the output circuit indicating a depth less than the predetermined depth, and for producing full scale reading for depths of the predetermined depth in alternate settings thereof, and further including a depth alarm circuit connected to the input circuit for providing an alarm when the depth indicated by the echo signal is less than a predetermined selected depth.

7. Depth sounder repeater structure for use in conjunction with shipboard sonar which shipboard sonar produces main transmitted pulses of high frequency electrical energy and receives echo pulses from distant underwater objects the time between which is representative of an underwater distance comprising signal receiving circuit means for receiving a main sonar pulse and the first echo pulse corresponding thereto and producing a square wave electrical signal having a pulse width representative of the time between the reception of the main sonar pulse and the first echo pulse by the repeater structure, an output circuit for receiving the square wave signal and providing an indication representative of the distance between the sonar and a reflecting object producing the first corresponding echo pulse and comprising a one-shot multivibrator connected to the input circuit for producing an output depth alarm pedestal, means for varying the depth alarm pedestal, a multivibrator for receiving the pedestal and a differentiated signal representative of the depth indicated by the echo signal from the input circuit and for providing an output when the depth indicated by the echo signal is less than the depth alarm pedestal.

8. Depth sounder repeated structure for use in conjunction with shipboard sonar which shipboard sonar produces main transmitted pulses of high frequency energy and receives echo pulses from distant underwater objects the time between which is representative of an underwater distance comprising signal receiving circuit means connected to the shipboard sonar by only four lines for receiving a main sonar pulse and the first echo pulse corresponding thereto and producing a square wave electrical signal having a pulse width representative of the time between the reception of the main sonar pulse and the first echo pulse by the repeater structure, a timing oscillator for producing electrical impulses at a selected rate during the time it is turned on, means operable between the signal receiving means and the timing oscillator for insuring that one and only one main sonar pulse and the first echo from the one main sonar pulse turns the oscillator on and off respectively including a first multivibrator for preparing a second multivibrator to receive a main transmission pulse and to produce an output responsive thereto for turning on the timing oscillator, in response to the first echo signal, and a second multivibrator for receiving the main transmitted signal operable when prepared to provide an output signal to the timing oscillator on receipt of the main transmitted signal and to subsequently cut off the output signal to the timing oscillator in response to the receipt of the first echo signal of the corresponding main transmitted signal and to provide a signal for returning the first multivibrator to a state wherein it will not prepare the second multivibrator to receive another main transmission pulse, and display means connected to the timing oscillator for displaying the depth indicated by the time between the one main sonar pulse and the first echo thereof as represented by the number of electrical impulses produced by the timing oscillator in the time between the one main pulse and the first echo thereof.

9. Depth sounder repeater structure for use in conjunction with shipboard sonar which shipboard sonar produces main transmitted pulses of high frequency energy and receives echo pulses from distant underwater objects the time between which is representative of an underwater distance comprising signal receiving circuit means connected to the shipboard sonar by only four lines for receiving a main sonar pulse and the first echo pulse corresponding thereto and producing a square wave electrical signal having a pulse width representative of the time between the reception of the main sonar pulse and the first echo pulse by the repeater structure, a timing oscillator for producing electrical impulses at a selected rate during the time it is turned on, means operable between the signal receiving means and the timing oscillator for insuring that one and only one main sonar pulse and the first echo from the one main sonar pulse turns the timing oscillator on and off respectively, display means connected to the timing oscillator for displaying the depth indicated by the time between the one main sonar pulse and the first echo thereof as represented by the number of electrical impulses produced by the timing oscillator in the time between the one main pulse and the first echo thereof and a display timing circuit operably associated with the signal receiving circuit means, the one and only one circuit and the display circuit including a one-shot multivibrator for receiving a differentiated square wave signal from the signal input circuit operable in response to the first received echo signal of a main transmitted pulse to produce an output signal, means for inverting the output signal of the one-shot multivibrator and means for differentiating the inverted output signal of the one-shot multivibrator to provide a trigger pulse for actuating the one and only one circuit periodically for limiting the one and only one circuit to selected periodic actuation and to reset the display circuit immediately prior to each actuation of the one and only one circuit.

10. Structure as set forth in claim 9, wherein the means for insuring that one and only one main sonar pulse and the first echo from the one main sonar pulse turns the timing oscillator on and off respectively includes a first multivibrator for preparing a second multivibrator to receive a main transmission pulse and to produce an output responsive thereto fur turning on the timing oscillator, in response to the first echo signal, and a second multivibrator for receiving the main transmitted signal operable when prepared to provide an output signal to the timing oscillator on receipt of the main transmitted signal and to subsequently cut off the output signal to the timing oscillator in response to the receipt of the first echo signal of the corresponding main transmitted signal and to provide a signal for returning the first multivibrator to a state wherein it will not prepare the second multivibrator to receive another main transmission pulse.

11. Depth sounder repeater structure for use in conjunction with shipboard sonar which shipboard sonar produces main transmitted pulses of high frequency energy and receives echo pulses from distant underwater objects the time between which is representative of an underwater distance comprising signal receiving circuit means connected to the shipboard sonar by only four lines for receiving a main sonar pulse and the first echo pulse corresponding thereto and producing a square wave electrical signal having a pulse width representative of the time between the reception of the main sonar pulse and the first echo pulse by the repeater structure, an output circuit for receiving the square wave signal and providing an indication representative of the distance between the sonar and a reflecting object producing the first corresponding echo pulse and means operably connected between the input circuit and output circuit for preventing transmission of square wave pulses from the input circuit to the output circuit when no echo signal is received by the input circuit including an AND gate and a lost echo circuit connected to receive the square wave signal from the input circuit and to provide one input to the AND gate including a one-shot multivibrator and structure connected to the one-shot multivibrator for receiving the square wave pulse from the input circuit and preventing timing out of the one-shot multivibrator on loss of the echo signal, including a differentiating circuit having a capacitor and resistor in series for receiving the square wave pulse from the input circuit, a transistor operable to be turned on on reception of the square wave pulse from the input circuit across the differentiating circuit, and a resistor and capacitor in series between the differentiating circuit and the transistor, the capacitor of which is connected across the emitter collector circuit of the transistor for determining the time of turn on of the transistor and therefore the timing out of the multivibrator, and an indicator light connected to the multivibrator operable to indicate the timing out of the multivibrator and thus the loss of the echo signal from the sonar.

12. Depth sounder repeater structure for use in conjunction with shipboard sonar which shipboard sonar produces main transmitted pulses of high frequency energy and receives echo pulses from distant underwater objects the time between which is representative of an underwater distance comprising signal receiving circuit means connected to the shipboard sonar by only four lines for receiving a main sonar pulse and the first echo pulse corresponding thereto and producing a square wave electrical signal having a pulse width representative of the time between the reception of the main sonar pulse and the first echo pulse by the repeater structure, an output circuit for receiving the square wave signal and providing an indication representative of the distance between the sonar and a reflecting object producing the first corresponding echo pulse, means operably connected between the input circuit and output circuit for preventing transmission of square wave pulses from the input circuit to the output circuit when no echo signal is received by the input circuit including an AND gate and a lost echo circuit connected to receive the square wave signal from the input circuit and to provide one input to the AND gate including a one-shot multivibrator and structure connected to the one-shot multivibrator for receiving the square wave pulse from the input circuit and preventing timing out of the one shot multivibrator on loss of the echo signal, including a differentiating circuit having a capacitor and resistor in series for receiving the square wave pulse from the input circuit, a transistor operable to be turned on on reception of the square wave pulse from the input circuit across the differentiating circuit, and a resistor and capacitor in series between the differentiating circuit and the transistor, the capacitor of which is connected across the emitter collector circuit of the transistor for determining the time of turn on of the transistor and therefor the timing out of the multivibrator, and an indicator light connected to the multivibrator operable to indicate the timing out of the multivibrator and thus the loss of the echo signal from the sonar and means operably connected to the input and output circuit for sensing depths below and above a predetermined depth and for manually changing the full scale reading of the output circuit in response to recognition of a predetermined depth.

13. Depth sounder repeater structure for use in conjunction with shipboard sonar which shipboard sonar produces main transmitted pulses of high frequency energy and receives echo pulses from distant underwater objects the time between which is representative of an underwater distance comprising signal receiving circuit means connected to the shipboard sonar by only four lines for receiving a main sonar pulse and the first echo pulse corresponding thereto and producing a square wave electrical signal having a pulse width representative of the time between the reception of the main sonar pulse and the first echo pulse by the repeater structure, an output circuit for receiving the square wave signal and providing an indication representative of the distance between the sonar and a reflecting object producing the first corresponding echo pulse, means operably connected between the input circuit and output circuit for preventing tranmission of square wave pulses from the input circuit to the output circuit when no echo signal is received by the input circuit and means operably connected to the input and output circuits for sensing depths below and above a predetermined depth and for manually changing the full scale reading of the output circuit in response to recognition of a predetermined depth comprises a scale expansion circuit including a one-shot multivibrator connected to the input circuit to receive a signal representative of the main sonar pulses, an inverter circuit connected to the one-shot multivibrator to invert the output of the one-shot multivibrator, and means for feeding the inverted signal from the one-shot multivibrator to the input circuit after a predetermined selectable time representative of the predetermined depth, and means within the input circuit for inhibiting echo signals from passing through the input circuit if the echo signals reflect a depth less than the predetermined depth, and a manually operable switch having portions connected in the scale expanding circuit and portions connected in the output circuit for producing a full scale reading in the output circuit indicating a depth less than the predetermined depth, and for producing full scale reading for a depth above the predetermined depth in alternate settings thereof.

14. Depth sounder repeater structure for use in conjunction with shipboard sonar which shipboard sonar produces main transmitted pulses of high frequency energy and receives echo pulses form distant underwater objects the time between which is representative of an underwater distance comprising signal receiving circuit means connected to the shipboard sonar by only four lines for receiving a main sonar pulse and the first echo pulse corresponding thereto and producing a square wave electrical signal having a pulse width representative of the time between the reception of the main sonar pulse and the first echo pulse by the repeater structure, an output circuit for receiving the square wave signal and providing an indication representative of the distance between the sonar and a reflecting object producing the first corresponding echo pulse, means operably connected between the input circuit and output circuit for preventing transmission of square wave pulses from the input circuit to the output circuit when no echo signal is received by the input circuit including an AND gate and a lost echo circuit connected to receive the square wave signal from the input circuit and to provide one input to the AND gate including a one-shot multivibrator and structure connected to the one-shot multivibrator for receiving the square wave pulse from the input circuit and preventing timing out of the one-shot multivibrator on loss of the echo signal, including a differentiating circuit having a capacitor and resistor in series for receiving the square wave pulse from the input circuit, a transistor operable to be turned on on reception of the square wave pulse from the input circuit across the differentiating circuit, and a resistor and capacitor in series between the differentiating circuit and the transistor, the capacitor of which is connected across the emitter collector circuit of the transistor for determining the time of turn on of the transistor and therefore the timing out of the multivibrator, and an indicator light connected to the multivibrator operable to indicate the timing out of the multivibrator and thus the loss of the echo signal from the sonar, means operably connected to the input and output circuits for sensing depths below and above a predetermined depth and for manually changing the full scale reading of the output circuit in response to recognition of a predetermined depth and further including a depth alarm circuit connected to the input circuit for providing an alarm when the depth indicated by the echo signal is less than a predetermined selected depth.

15. Depth sounder repeater structure for use in conjunction with shipboard sonar which shipboard sonar produces main transmitted pulses of high frequency energy and receives echo pulses from distant underwater objects the time between which is representative of an underwater distance comprising signal receiving circuit means connected to the shipboard sonar by only four lines for receiving a main sonar pulse and the first echo pulse corresponding thereto and producing a square wave electrical signal having a pulse width representative of the time between the reception of the main sonar pulse and the first echo pulse by the repeater structure, an output circuit for receiving the square wave signal and providing an indication representative of the distance between the sonar and a reflecting object producing the first corresponding echo pulse, means operably connected between the input circuit and output circiuit for preventing transmission of square wave pulses from the input circuit to the output circuit when no echo signal is received by the input circuit, means operably connected to the input and output circuits for sensing depths below and above a predetermined depth and for manually changing the full scale reading of the output circuit in response to recognition of a predetermined depth including a scale expansion circuit including a one-shot multivibrator connected to the input circuit to receive a signal representative of the main sonar pulses, an inverter circit connected to the one-shot multivibrator portion to invert the output of the one-shot multivibrator, and means for feeding the inverted signal from the one-shot multivibrator to the input circuit after a predetermined selectable time representative of the predetermined depth, and means within the input circuit for inhibiting echo signals from passing through the input circuit if the echo signals reflect a depth less than the predetermined depth, and a manually operable switch having portions connected in the scale expanding circuit and portions connected in the output circuit for producing a full scale reading in the output circuit indicating a depth less than the predetermined depth, and for producing a full scale reading for depths of the predetermined depth in alternate settings thereof and a depth alarm circuit connected to the input circuit for providing an alarm when the depth indicated by the echo signal is less than a predetermined selected depth.

16. Depth sounder repeater structure for use in conjunction with shipboard sonar which shipboard sonar produces main transmitted pulses of high frequency energy and receives echo pulses from distant underwater objects the time between which is representative of an underwater distance comprising signal receiving circuit means connected to the shipboard sonar by only four lines for receiving a main sonar pulse and the first echo pulse corresponding thereto and producing a square wave electrical signal having a pulse width representative of the time between the reception of the main sonar pulse and the first echo pulse by the repeater structure, an output circuit for receiving the square wave signal and providing an indication representative of the distance between the sonar and a reflecting object producing the first corresponding echo pulse, means operably connected between the input circuit and output circuit for preventing transmission of square wave pulses from the input circuit to the output circuit when no echo signal is received by the input circuit, means operably connected to the input and output circuits for sensing depths below and above a predetermined depth and for manually changing the full scale reading of the output circuit in response to recognition of a predetermined depth and a depth alarm circuit connected to the input circuit for providing an alarm when the depth indicated by the echo signal is less than a predetermined selected depth including a one-shot multivibrator connected to the input circuit for producing an output depth alarm pedestal, means for varying the depth alarm pedestal, a multivibrator for receiving the pedestal and a differentiated signal representative of the depth indicated by the echo signal from the input circuit and for providing an output when the depth indicated by the echo signal is less than the depth alarm pedestal.

17. Depth sounder repeater structure for use in conjunction with shipboard sonar which shipboard sonar produces main transmitted pulses of high frequency energy and receives echo pulses from distant underwater objects the time between which is representative of an underwater distance comprising signal receiving circuit means connected to the shipboard sonar by only four lines for receiving a main sonar pulse and the first echo pulse corresponding thereto and producing a square wave electrical signal having a pulse width representative of the time between the reception of the main sonar pulse and the first echo pulse by the repeater structure, an output circuit for receiving the square wave signal and providing an indication representative of the distance between the sonar and a reflecting object producing the first corresponding echo pulse, means operably connected between the input circuit and output circuit for preventing transmission of square wave pulses from the input circuit to the output circuit when no echo signal is received by the input circuit including an AND gate and a lost echo circuit connected to receive the square wave signal from the input circuit and to provide one input to the AND gate including a one-shot multivibrator and structure connected to the one-shot multivibrator for receiving the square wave pulse from the input circuit and preventing timing out of the one-shot multivibrator on loss of the echo signal, including a differentiating circuit having a capacitor and resistor in series for receiving the square wave pulse from the input circuit, a transistor operable to be turned on on reception of the square wave pulse from the input circuit across the differentiating circuit, and a resistor and capacitor in series between the differentiating circuit and the transistor, the capacitor of which is connected across the emitter collector circuit of the transistor for determining the time of turn on of the transistor and therefore the timing out of the multivibrator, and an indicator light connected to the multivibrator operable to indicate the timing out of the multivibrator and thus the loss of the echo signal from the sonar and a depth alarm circuit connected to the input circuit for providing an alarm when the depth indicated by the echo signal is less than a predetermined selected depth.

18. Depth sounder repeater structure for use in conjunction with shipboard sonar which shipboard sonar produces main transmitted pulses of high frequency energy and receives echo pulses from distant underwater objects the time between which is representative of an underwater distance comprising signal receiving circuit means connected to the shipboard sonar by only four lines for receiving a main sonar pulse and the first echo pulse corresponding thereto and producing a square wave electrical signal having a pulse width representative of the time between the reception of the main sonar pulse and the first echo pulse by the repeater structure, an output circuit for receiving the square wave signal and providing an indication representative of the distance between the sonar and a reflecting object producing the first corresponding echo pulse, means operably connected between the input circuit and output circuit for preventing transmission of square wave pulses from the input circuit to the output circuit when no echo signal is received by the input circuit and a depth alarm circuit connected to the input circuit for providing an alarm when the depth indicated by the echo signal is less than a predetermined selected depth including a one-shot multivibrator connected to the input circuit for producing an output depth alarm pedestal, means for varying the depth alarm pedestal, a multivibrator for receiving the pedestal and a differentiated signal representative of the depth indicated by the echo signal from the input circuit and for providing an output when the depth indicated by the echo signal is less than the depth alarm pedestal.

* * * * *